United States Patent [19]

Lancaster et al.

[11] Patent Number: 5,272,226
[45] Date of Patent: Dec. 21, 1993

[54] PHENOLIC RESIN ALKOXYLATES

[75] Inventors: Michael Lancaster; David J. Moreton; Alexander F. Psaila, all of Hull, England

[73] Assignee: BP Chemicals Ltd., London, England

[21] Appl. No.: 773,379

[22] Filed: Oct. 7, 1991

[30] Foreign Application Priority Data

Oct. 9, 1990 [GB] United Kingdom ............... 9021973
Oct. 27, 1990 [GB] United Kingdom ............... 9023408

[51] Int. Cl.$^5$ .................. C08L 61/06; C08L 61/08; C08L 61/12; C08L 71/02
[52] U.S. Cl. ................................ 525/507; 525/480
[58] Field of Search ............................ 525/480, 507

[56] References Cited

U.S. PATENT DOCUMENTS

| | | | |
|---|---|---|---|
| 3,873,490 | 3/1975 | Grazen et al. | 525/501 |
| 4,029,596 | 6/1977 | Fink et al. | 252/329 |
| 4,032,514 | 6/1977 | Buriks et al. | 260/51 EP |
| 4,046,521 | 9/1977 | Bessler et al. | 44/62 |
| 4,260,019 | 4/1981 | Blair, Jr. | 166/274 |
| 4,431,565 | 2/1984 | Billinstein et al. | 252/331 |
| 4,465,817 | 8/1984 | Billinstein et al. | 525/507 |

FOREIGN PATENT DOCUMENTS

| | | |
|---|---|---|
| 0078975 | 5/1983 | European Pat. Off. |
| 0097897 | 1/1984 | European Pat. Off. |
| 1210506 | 10/1970 | United Kingdom |
| 2118937 | 11/1983 | United Kingdom |

*Primary Examiner*—James J. Seidleck
*Assistant Examiner*—W. R. M. Clark
*Attorney, Agent, or Firm*—Charles S. Lynch; Michael F. Esposito; David J. Untener

[57] ABSTRACT

This invention relates to a process for the production of a polyoxyalkylene derivative of a phenolic resin, by reacting under base-catalyzed conditions the phenolic resin with the appropriate alkylene oxide(s) so that the polyoxyalkylation is carried out by: A) using a phenolic resin which has a water content of less than 0.5% w/w, B) reacting the phenolic resin initially with about one mole of the alkylene oxide(s) per mole of the resin in the absence of a base catalyst in an inert atmosphere at a temperature below 140° C. until the partial pressure of the alkylene oxide(s) reactant is substantially neutralized, and C) reacting the product from step (B) above with the remainder of the alkylene oxide(s). These derivatives are good emulsifiers and demulsifers.

10 Claims, No Drawings

PHENOLIC RESIN ALKOXYLATES

The present invention relates to a method of synthesis of polyoxyalkylene derivatives of phenolic resin, in particular to the synthesis of polyoxylakylene derivatives of low molecular weight phenolic resins and the use thereof as emulsifiers or demulsifiers.

It is well known to produce alkoxylates of phenolic resins by the reaction of a phenolic resin with an alkylene oxide in the presence of a base catalyst. However, the product produced by such a direct reaction has resulted in high molecular weight material due to undesirably high cross-linking in the product. Such products are usually unsuitable for use in demulsifier applications.

These problems are particularly accentuated and apparent when polyoxalkylating phenolic resins of relatively low molecular weight such as e.g. those containing around 4-5 phenolic units.

It has now been found that by controlling the reaction conditions and the mode of addition of the reactants, the rate of polyoxyalkylation and molecular weight of the polyoxyalkylated product can be controlled thereby mitigating the problems of prior art.

Accordingly the present invention is a process for the production of a polyoxyalkylene derivative of a phenolic resin, said process comprising reacting under base-catalysed conditions the phenolic resin with the appropriate alkylene oxide(s) characterised in that the polyoxyalkylation is carried out by:

A) using a phenolic resin which has water content of less than 0.5% w/w,

B) reacting the phenolic resin initially with about one mole of the alkylene oxide(s) per mole of the resin in the absence of a base catalyst in an atmosphere inert under the reaction conditions, under pressure and at a temperature below 140° C. until such time that the partial pressure contribution by the alkylene oxide(s) reactant is substantially neutralised as observed by the drop in reaction pressure, and C) reacting the product from step (B) above with the remainder of the alkylene oxide(s) in the presence of a base whilst maintaining the reaction temperature below 140° C.

A feature of the invention is that this mode of reaction appears to minimise the undesirable cross-linking resulting from the presence of free methylol groups when the phenolic resin is reacted directly with a molar excess of the alkylene oxide.

The phenolic resins used to produce the polyoxyalkylene derivative may be straight-chain resins or cyclic resins such as e.g. calixarenes or mixtures thereof.

The phenolic resin is suitably derived by reacting in a liquid medium an alkyl phenol, preferably a para-alkyl phenol with formaldehyde suitably in the presence of a base, preferably ammonia.

The phenol reactant suitably has from 4-18 carbon atoms in the alkyl substituent, preferably from 4-12 carbon atoms. The alkyl substituent is preferably a tertiary alkyl group e.g. a tert-butyl group.

The formaldehyde used may be in any form commercially available such as e.g. formaldehyde as such or as formalin solution or as paraformaldehyde, provided that the reactant used can readily generate the formaldehyde monomer in situ under the reaction conditions.

The phenolic resin is suitably prepared by reacting the phenol and the aldehyde in a liquid medium, preferably in a hydrocarbon solvent which is inert under the reaction conditions such as e.g. "KEMELIX" H 610 (Regd. Trade Mark, a petroleum derived solvent high in aromatic content and consisting mainly of $C_9$ and $C_{10}$ alkyl benzenes, ex ICI).

When the reaction is carried out in the presence of ammonia as a base and using suitable conditions such as rapid removal of water from the reaction mixture the water content of the phenolic resin can be kept to below the desired level of 0.5% w/w and the product so formed is usually a resin of low molecular weight and a narrow molecular weight distribution. In addition such a product has a free phenol content of below 27% w/w as determined by GPC and a viscosity of 100-300 cSt at 25° C. The phenolic resin so produced also has a significant proportion e.g. upto 50% of calixarenes. However, this reaction product can be used directly for alkoxylation without having to separate the straight chain phenolic resins from the cyclic calixarenes.

The straight chain phenolic resin has the following structure:

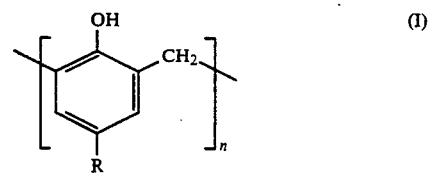

wherein R is a $C_4$-$C_{18}$ alkyl group and n is predominantly 4, and wherein said structure optionally contains methylol groups on either end of the chain.

Irrespective of the method by which the phenolic resin reactant is produced it is essential that the water content of the resin is below 0.5% w/w, preferably below 0.4% w/w, most preferably below 0.35% w/w. Water content may be reduced to such low levels by conventional stripping techniques.

The alkylene oxide reactant suitably has 2-4 carbon atoms and may be reacted with the phenolic resin either (i) singly, or (ii) sequentially using more than one alkylene oxide, or (iii) as a mixture of more than one alkylene oxide. Ethylene oxide, propylene oxide or mixtures thereof are preferred. The alkylene oxide used is most preferably ethylene oxide as the polyoxyethylene derivatives are most desirable for use as demulsifiers.

As mentioned previously, it is essential that the phenolic resin is substantially free of water, i.e. the water concentration should not be greater than 0.5% w/w of the total resin. In addition it is also desirable to reduce the free phenol content of the resin to below 27% w/w as determined by GPC in order to minimise the formation of unwanted by products.

The first stage (B) of this two-stage reaction is carried out in the absence of any base. In this stage, a solution of the phenolic resin in an inert solvent such as an aromatic hydrocarbon is reacted with about an equimolar amount of the alkylene oxide. The reaction is carried out in an atmosphere inert under the reaction conditions, e.g. nitrogen, and under pressure. The reaction pressure will be combined partial pressure of the inert atmosphere and the alkylene oxide reactant. It is suitably such that the two components contribute substantially equally to the reaction pressure though this is not an essential condition for the success of the reaction. The reaction pressure is suitably below 10 bar, preferably below 5.5 bar. The reaction temperature for this stage is suitably below 140° C., preferably from about 130°-138° C. The completion of this reaction is indicated by the drop in reaction pressure and when the partial pressure contribution from the alkylene oxide is neutralised it can be assumed that the reaction is virtually complete. Of course, the progress of the reaction can be monitored by other conventional methods such as the determination of the hydroxyl number of the intermediate product at this stage. This reaction should take about 1-2 hours and the reaction is suitably continued for a further duration at that temperature to ensure completion.

The reaction mixture resulting from the first stage (B) is then reacted with the remainder of the alkylene oxide in a second stage (C) but this time in the presence of a base. The base is suitably such the pH of the reaction mixture is greater than 7.5 suitably in the region of 7.5 to 9.0. The pH of the reaction is determined by taking an aliquot of the reaction mixture as a 1% solution in a 1:1 w/w mixture of isopropyl alcohol and water. The base used is suitably an alkali or alkaline earth metal hydroxide, preferably potassium hydroxide.

This second stage (C) of the reaction is also carried out at a temperature not greater than 140° C., suitably from 130°-138° C. The completion of this stage of the reaction is monitored by monitoring the hydroxyl number of the reaction mixture. This value should suitably be as low as is possible but normally it would be below 170, suitably from 134-160 as determined by the milligrams of KOH used per gram of the sample tested (according to British Standard Test No. 6829 Section 4.6). The hydroxyl number can be correlated with the average of the molecular weight of the product based on comparison with predetermined values. If the appropriate hydroxyl number is not attained, further aliquots of the alkylene oxide reactant may have to be added. It is to be noted that the higher the molecular weight of the polyoxyalkylated resin the lower the hydroxyl number. For instance, for a resin which has been alkoxylated with 3 moles of an alkylene oxide such as ethylene oxide, the hydroxyl number should be around 160. The reactants are maintained at the temperature of a further period of about an hour to ensure completion of the reaction. The final product should be a red-brown liquid, suitably clear and have a viscosity of 100-600 cSt at 25° C.

The reaction mixture may be alkaline at this stage due to the presence of excess base. This can be neutralised, if desired, by the addition of a weak acid such as lactic acid.

The polyoxylakylated products so produced are excellent components of demulsifier formulations. Typically a demulsifier formulation contains upto 50% w/w of the phenolic resin alkoxylate, some conventional surfactants of the polyoxyalkylene polyoxypropylene copolymer type and a solvent medium which may be typically a hydrocarbon solvent inert under the conditions of use.

By varying the type of oxyalkylene groups in the alkoxylate and the surfactant these can also be used as emulsifiers.

The present invention is further illustrated with reference to the following Examples:

EXAMPLE 1

1.1 Synthesis of the Phenolic Resin

A 40 kg capacity steam jacketed stainless steel-lined vessel was used, with stirer, column, condensor and Dean and Stark trap to carry out the reaction. The jacket was adapted to use oil, if necessary. The vessel was charged with p-t-butyl phenol (13.4 kg ex Schenectady), 44.13% formalin (7.45 kg), Kemelix H610 (Regd. Trade Mark, 13.4 kg, an alkyl benzene solvent ex ICI) and 25.9% aqueous ammonia (26 mls). A slight exotherm from 20° to 22° C. was noted on addition of ammonia. The reaction mixture was then heated to 50° C. and sampled for pH to ensure that it was above 7.5 and held at 50° C. for 30 minutes and then 2 ml of a silane Antifoam A (a filled polydimethylsiloxane, ex Dow Chemicals) was added. The reaction mixture was then heated to 85° C. and held at that temperature for 90 minutes, followed by careful heat to reflux. At 95° C. water began to be removed via the Dean Stark, and the water was distilled off as quickly as reasonably possible. After 90 minutes the temperature had reached 120° C. for one hour and a further 90 g of water was collected. The reaction mixture was then heated directly to 140° C. and held at this temperature for 4 hours, after which duration the product upon sampling had an RSN of 16.6 and hence within the desired specification. A total of 5.71 kg of water, 95% of theoretical, was collected. The water content of the batch was measured to be 0.55%, which is marginally above the desired specification of 0.5%. Hence the reaction mixture was vacuum distilled under reflux at 100° C., using upto 26 inches of vacuum, for 30 minutes. This reduced the water content of the product to 0.08%. The free phenol content of the batch was measured at 16.8% which is well within the desired specification.

The identity of the resin was confirmed by GPC. The specification of the product is tabulated below for ease of comparison with that desired.

| Test | Specification | |
| --- | --- | --- |
| | Desired | Found |
| RSN (ml at 25° C.) | 16.3-16.9 | 16.6 |
| Water Content | 0.5% max | 0.08% |
| Viscosity (cSt at 25° C.) | 100-300 | 190 |
| Appearance | Red-brown suspension | Red-brown suspension |
| GPC | Standard | Substantially similar to Standard |
| Free Phenol Content | <27% (GPC) | 16.8% (GLC) |

1.2 Synthesis of the Polyoxyalkylene Derivative

A reaction vessel, which was stainless steel lined and provided with a steam jacket was used. The vessel was checked to ensure that it was clean and dry. The vessel was charged with a total of 1940 kg of the phenolic resin product from section 1.1 above ensuring that the water content of the resin was below 0.35% w/w. The resin was heated to 130° C. and as a first addition (the first stage) a total of 302 kg of ethylene oxide was added via a weight tank at a rate which did not increase the ethylene oxide partial pressure in the vessel above 2.3 bar at 130°-138° C. over a duration of about one hour. The vessel headspace also had 3 bar nitrogen pressure. In this first addition the ethylene oxide was consumed as quickly as it was added. Once the addition was complete, the reaction mixture was maintained in at 130° C. for about 90 minutes.

To the reaction mixture from the first stage above was added a total of 0.734 kg (0.025% w/w of the total ingredients added) of solid potassium hydroxide and the solution so formed reacted with a further amount of ethylene oxide 607 kg) at 130°-138° C. This took about 3.5 hours. The ethylene oxide was then cooked in for about 105 minutes. The hydroxyl number and viscosity of the reaction mixture was determined and compared against a predetermined specification. The method was repeated three times to produce three batches. The product from the three batches had the following average characteristics:

| | |
|---|---|
| Hydroxyl No. | 144 |
| pH (1% solution in 1:1 w/w IPA/water mix) | 7.5-8.5 |
| Viscosity at 25° C. (cSt) | 203 |
| Appearance of liquid product | Clear red-brown |

We claim:

1. A process for the production of a polyoxyalkylene derivative of a phenolic resin, said process comprising reacting phenolic resin with appropriate alkylene oxide(s) such that the polyoxyalkylation is carried out by:
   A) using phenolic resin which has a water content of less than 0.5% w/w
   B) reacting the phenolic resin initially with about one mole of the aklylene oxide(s) per mole of the resin in the absence of a base catalyst in an atmosphere inert under the reaction conditions, under pressure and at temperature below 140° C. until such time that the partial pressure contribution by the alkylene oxide(s) reactant is substantially neutralised as observed by the drop in reaction pressure, and
   C) reacting the product from step (B) above with the remainder of the alkylene oxide(s) in the presence of a base whilst maintaining the reaction temperature below 140° C.

2. A process according to claim 1 wherein the phenolic resin reactant is a reaction product of an alkyl phenol and formaldehyde in the presence of a base.

3. A process according to claim 2 wherein the alkyl phenol has 4-18 carbon atoms in the alkyl chain.

4. A process according to claim 2 wherein the alkyl chain in the alkyl phenol is a tertiary alkyl group.

5. A process according to claim 1 wherein the phenolic resin reactant has a water content of less than 0.4% w/w.

6. A process according to claim 1 wherein the alkylene oxide reactant has 2-4 carbon atoms.

7. A process according to claim 1 wherein the alkylene oxide is ethylene oxide, propylene oxide or mixtures thereof.

8. A process according to claim 1 wherein the polyoxyalkylated phenolic resin product has a hydroxyl number below 170 determined by milligrams of KOH used per gram of the product.

9. A process according to claim 1 wherein the polyoxyalkylated phenolic resin product has a viscosity of 100-600 centistokes at 25° C.

10. A demulsifier or an emulsifier composition comprising a polyoxyalkylated phenolic resin product obtained by a process according to claim 1.

* * * * *